UNITED STATES PATENT OFFICE.

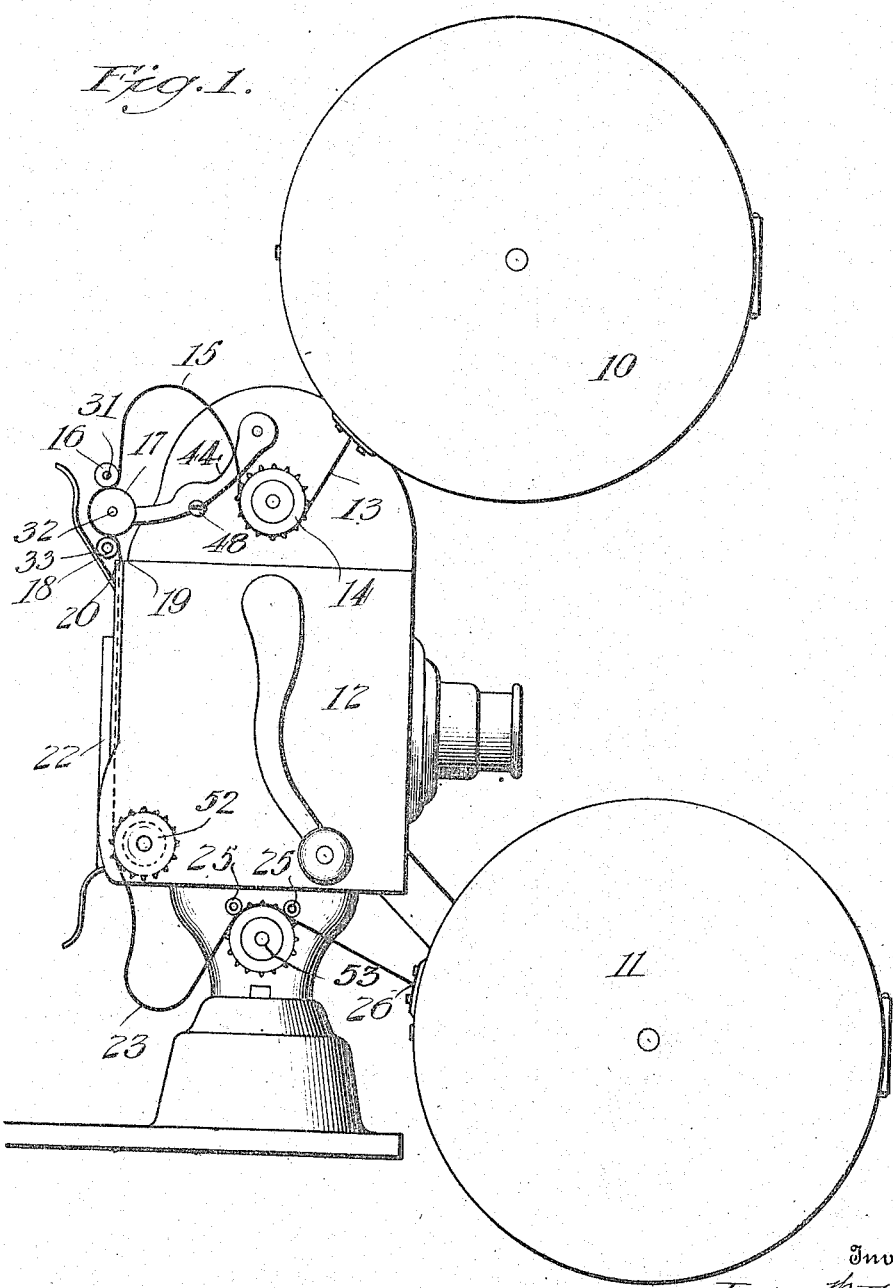

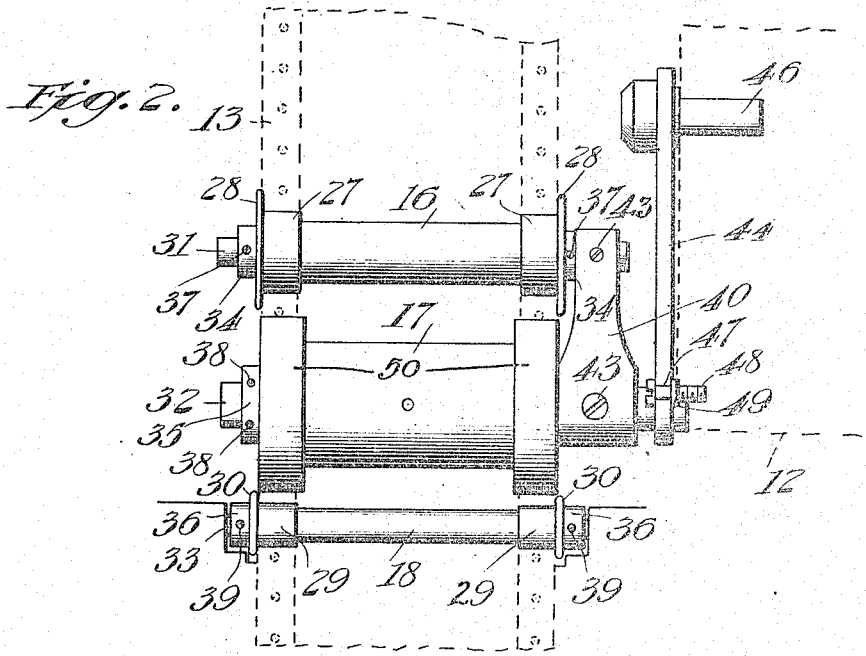

JAMES W. EARLY, OF DEADWOOD, SOUTH DAKOTA, ASSIGNOR OF ONE-HALF TO ROBERT P. STEWART, OF DEADWOOD, SOUTH DAKOTA.

FILM-GUIDE FOR MOVING-PICTURE MACHINES.

1,129,341. Specification of Letters Patent. Patented Feb. 23, 1915.

Application filed May 29, 1911. Serial No. 630,231.

*To all whom it may concern:*

Be it known that I, JAMES W. EARLY, a citizen of the United States, residing at Deadwood, in the county of Lawrence and State of South Dakota, have invented new and useful Improvements in Film-Guides for Moving-Picture Machines, of which the following is a specification.

My invention relates to moving picture machines and particularly to film guides for such machines.

The object of the invention is to provide means, applicable to any of the moving picture machines now in common use, to properly feed the film from the upper magazine, past the lens and into the lower or receiving magazine.

A further object is to provide improved means for attaching the film guide rolls to and suspending them from a wall or other support.

With these objects in view the invention consists in the improved construction, arrangement and combination of parts of a film feeding mechanism which will be hereinafter fully described and afterward specifically claimed.

In order that my invention may be readily comprehended, I have illustrated a preferred embodiment of it in the accompanying drawings which I shall now proceed to specifically describe with reference thereto and to the reference characters thereon.

In these drawings, Figure 1 represents a view in side elevation of a moving picture machine of the well known Motiograph type, with my invention embodied therewith. Fig. 2 represents a view in front elevation of the principal parts of the feeding mechanism, adjacent parts being shown in dotted lines. Fig. 3 represents a view in side elevation of the arm for attaching my film guide and lock to the machine, detached from the machine. Fig. 4 represents a view in side elevation of the base and bearing for the small roller guide.

Like reference characters mark the same parts wherever they appear in the several parts of the drawings.

Referring specifically to the drawings, 10 indicates the upper magazine in which is placed the roll of film to be fed through the machine, 11 the lower or receiving magazine in which the film is again rolled up after passing through the machine, and 12 the moving picture machine, in this instance the "Motiograph" being illustrated although it will be readily apparent to those skilled in this art that the invention may also be applied to the "Edison", "Power" and other well known machines.

13 indicates the film which passes out from the magazine 10 and under the first sprocket wheel 14, the sprocket holes of the film engaging on the sprocket teeth of the wheels in the usual manner, the sprocket wheel 14 drawing the film out of the upper magazine. From the sprocket wheel 14 the film is thrown up, as at 15, in the form of a loop, before it passes under the upper small guide roller 16 and between it and the large film roll 17, and after passing about half around the large film roll, it passes between it and the lower small guide roller 18 passing partially around the lower small roller and makes a turn to the front, at 19, caused by the closing gate 22, making a partial loop around the large roll 17 in its passage to this point. The film passes between the gate 22 and the aperture plate 20, thence over the usual intermittent sprocket 52, forming a loop 23 and thence around the lower sprocket wheel 53, between it and the small rollers 25, 25, making a partial loop around the sprocket, to the lower or receiving magazine 11 at 26. The small guide roller 16 is provided with tracks 27, 27 for the film and also with side guide flanges 28, 28, while the larger roller 17 is provided with the track collars 50, 50 and the lower small guide roller 18 with track collars 29, 29 and side guide flanges 30, 30. Each of the rollers 16, 17 and 18 is mounted on a shaft as 31, 32 and 33, and is properly positioned and secured for rotation on its shaft by collars, as 34, 34, 35 and 36, 36, the collars being duly secured by set screws, as at 37, 38 and 39.

At 40 is indicated a bar having a small hole 41 in which the shaft 31 of the small roller 16 fits and a large hole 42 in which the shaft 32 of the large roller fits, the two shafts 31 and 32 being thus connected and prevented from turning within bar 40 by set screws 43. Outside of the bar 40 on the shaft 32 is fitted one end of a bar 44, whose outer or upper end 45 is secured to the machine frame by a set or thumb screw 46. This forms the attachment of the feeding and guiding mechanism to the machine and it is obvious that almost instantaneous attachment or detachment may be made. The arm 44 is provided on its under side with a notch 47 which fits over a set screw 48 threaded into the frame of the machine and provided with a collar 49 between the arm and the frame and by tightening up the screw 48 the arm 44 is held against pivotal movement on its pivot or supporting screw 46. The guide rolls 16 and 17, are thus held rigid in the position seen in Figs. 1 and 2.

The film in its course binds as it passes over the large roll 17 which is caused by the set of the upper film guide 16 and the course it must take to enter the lower film guide 18, and the film is thereby held in a straight line for the aperture plate opening, holding it so perfectly that all jumping is stopped as is also all side movement of the film, or weaving, the machine being well nigh noseless in operating, and much easier because with this arrangement the gate can be so loosened that the springs barely touch the film.

While I have very specifically described the construction of the various component parts of my invention, it will be readily apparent to those skilled in this art that many slight changes and variations might be made therein, without departing from the spirit and scope of the invention.

Having thus described my invention, what I claim as new and desire to secure by Letters Patent of the United States, is—

1. The combination in a moving picture machine having an upper sprocket and a lower sprocket located respectively in the upper and lower portion of the machine frame, a guide roller and a large roller parallel therewith, and shafts therefor both located in the path of the film passing from the upper to the lower sprocket, a bar having openings adapted to receive one end of said shafts and means for holding said shafts against rotation in said openings, a second bar outside said first named bar having an opening in its lower end adapted to receive the shaft of the large roller, said second bar having its upper end detachably pivoted to the machine frame and having a notch intermediate its ends, a set screw fitting in the notch and threaded into the frame of the machine, and a collar on the set screw between the bar and the frame.

2. The combination in a moving picture machine, having an upper sprocket and a lower sprocket located respectively in the upper and lower portion of the machine frame, a guide roller and a large roller parallel therewith, both located in the path of the film passing from the upper to the lower sprocket shafts for said rollers, a bar secured to said larger roller and means for attaching the opposite end of the bar to the machine frame, means for holding said guide roller shaft and larger roller shaft in fixed relation, said bar having a notch in one side, a set screw fitting in the notch and threaded into the frame of the machine, and a collar on the set screw between the bar and the frame.

In testimony whereof, I affix my signature in presence of two witnesses.

JAMES W. EARLY.

Witnesses:
L. B. EARLY,
T. WIRT.